United States Patent
Laakkonen et al.

(10) Patent No.: US 10,501,693 B2
(45) Date of Patent: Dec. 10, 2019

(54) PROCESS FOR MANUFACTURE OF LIQUID FUEL COMPONENTS FROM RENEWABLE SOURCES

(71) Applicant: NESTE OIL OYJ, Espoo (FI)

(72) Inventors: Marko Laakkonen, Vantaa (FI); Jukka Myllyoja, Vantaa (FI); Blanka Toukoniitty, Porvoo (FI); Mervi Hujanen, Helsinki (FI); Ari Saastamoinen, Helsinki (FI); Alpo Toivo, Helsinki (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 13/646,250

(22) Filed: Oct. 5, 2012

(65) Prior Publication Data

US 2013/0090502 A1 Apr. 11, 2013

Related U.S. Application Data

(60) Provisional application No. 61/544,767, filed on Oct. 7, 2011.

(30) Foreign Application Priority Data

Oct. 7, 2011 (EP) ..................... 11184266

(51) Int. Cl.
*C10G 3/00* (2006.01)
*C11B 3/00* (2006.01)
(Continued)

(52) U.S. Cl.
CPC ............ *C10G 3/00* (2013.01); *C11B 3/001* (2013.01); *C11B 3/006* (2013.01); *C11B 3/008* (2013.01);
(Continued)

(58) Field of Classification Search
USPC ........................................ 585/253
See application file for complete search history.

(56) References Cited

U.S. PATENT DOCUMENTS 4,062,882 A 12/1977 Sen Gupta
4,787,981 A * 11/1988 Tanahashi et al. .......... 210/639
(Continued)

FOREIGN PATENT DOCUMENTS

EP 0 079 799 A1 5/1983
EP 0 094 252 A1 11/1983
(Continued)

OTHER PUBLICATIONS

Miyake et al., Rapid determination of iodine value by 1H nuclear magnetic resonance spectroscopy, 1998, Journal of the American Oil Chemists' Society, vol. 75, pp. 15-19.*
(Continued)

*Primary Examiner* — Youngsul Jeong
(74) *Attorney, Agent, or Firm* — Buchanan Ingersoll & Rooney PC

(57) ABSTRACT

A method for producing liquid fuel components from renewable oil. A fresh feedstock including saturated fatty acids is subjected to dilution by an organic lipophilic solvent. The solvent has a low phosphorus and metal impurity content, less than 5 ppm and less than 10 ppm, respectively. Dilution is performed before and/or during purification by at least one pretreatment process for removal of phosphorus and metal impurities. Subsequently, the resulting purified feedstock is fed into at least one post-treatment process suitable for producing liquid fuel components.

22 Claims, 6 Drawing Sheets

(51) Int. Cl.
    *C11B 3/10* (2006.01)
    *C11C 3/12* (2006.01)
    *C11B 3/16* (2006.01)
    *C11C 3/00* (2006.01)
    *C11C 3/14* (2006.01)

(52) U.S. Cl.
    CPC .................. *C11B 3/10* (2013.01); *C11B 3/16* (2013.01); *C11C 3/00* (2013.01); *C11C 3/12* (2013.01); *C11C 3/14* (2013.01); *C10G 2300/1014* (2013.01); *C10G 2300/1018* (2013.01); *C10G 2300/202* (2013.01); *C10G 2300/205* (2013.01); *C10G 2300/4081* (2013.01); *C10G 2300/802* (2013.01); *C10G 2400/04* (2013.01); *Y02P 30/20* (2015.11)

(56) References Cited

U.S. PATENT DOCUMENTS

| | | | |
|---|---|---|---|
| 4,877,765 A | | 10/1989 | Pryor et al. |
| 7,638,644 B2* | | 12/2009 | Lee et al. ............... 554/175 |
| 2006/0264684 A1 | | 11/2006 | Petri et al. |
| 2007/0010682 A1* | | 1/2007 | Myllyoja et al. ........... 554/174 |
| 2009/0158637 A1 | | 6/2009 | McCall et al. |
| 2009/0266743 A1* | | 10/2009 | Yao et al. ................ 208/143 |
| 2010/0077652 A1 | | 4/2010 | Gruber et al. |
| 2011/0192073 A1 | | 8/2011 | Kale |
| 2011/0192075 A1 | | 8/2011 | Kale |
| 2011/0195085 A1 | | 8/2011 | Kale |
| 2011/0195484 A1 | | 8/2011 | Kale |
| 2011/0195485 A1 | | 8/2011 | Kale |
| 2011/0196131 A1 | | 8/2011 | Kale |
| 2011/0196132 A1 | | 8/2011 | Kale |
| 2011/0196135 A1 | | 8/2011 | Kale |

FOREIGN PATENT DOCUMENTS

| | | |
|---|---|---|
| EP | 1 741 768 A1 | 1/2007 |
| WO | WO 2009/148919 A1 | 12/2009 |

OTHER PUBLICATIONS

Barker et al., Kirk-Othmer Encyclopedia of Chemical Technology, 2005, John Wiley and Sons, Inc.*

Chevron (Diesel Fuels Technical Reviews, Chevron Corporation) (Year: 2007).*

Neste (Nexbtl Renewable Diesel Safety Data Sheet, 2016) (Year: 2016).*

European Search Report dated Dec. 27, 2011 for Application No. 11184266.2.

Renata Marenchino et al., "Vegetable Oil Degumming Using Inorganic Membranes", Desalination, Nov. 20, 2006, vol. 200, No. 1-3, pp. 562-564, XP-025162287.

Notification of Transmittal of the International Search Report (Forms PCT/ISA/220 and PCT/ISA/210) and the Written Opinion of the International Searching Authority (Form PCT/ISA/237) dated Dec. 31, 2012, issued in corresponding International Application No. PCT/FI2012/050941. (12 pages).

* cited by examiner

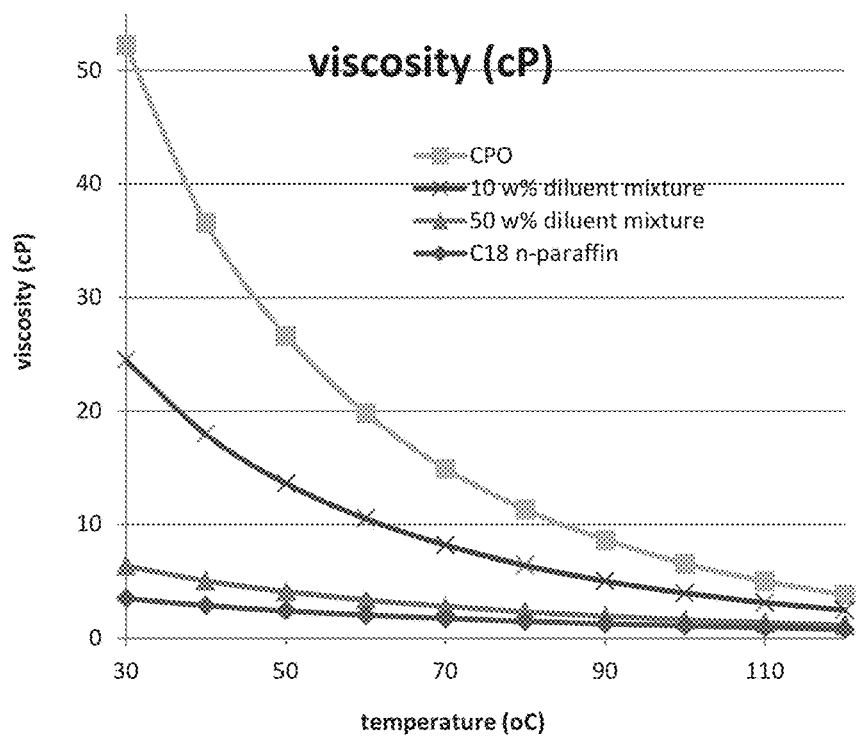
A
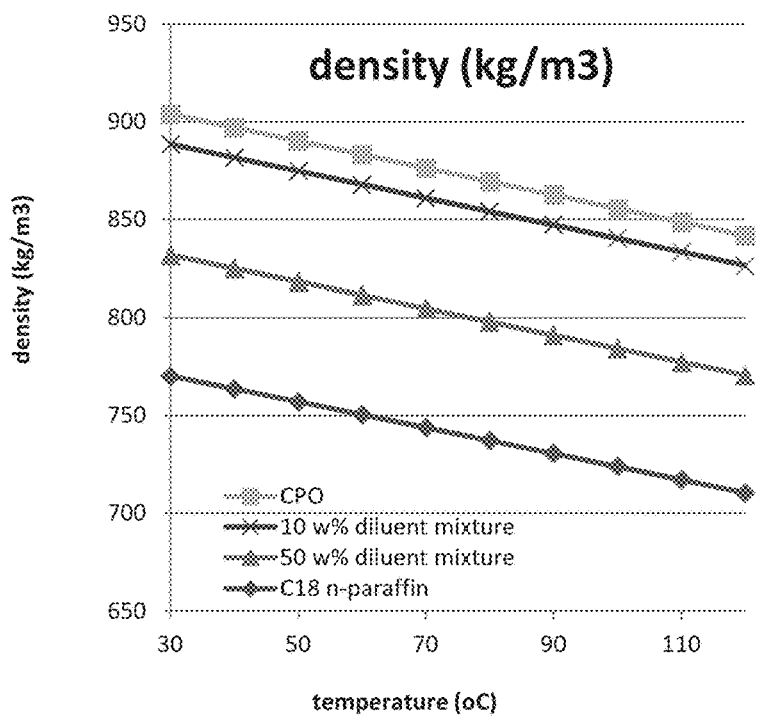
B
Figure 6 A and B

PROCESS FOR MANUFACTURE OF LIQUID FUEL COMPONENTS FROM RENEWABLE SOURCES

RELATED APPLICATIONS

This application claims priority under 35 U.S.C. § 119 to European Patent Application No. 11184266.2 filed in Europe on Oct. 7, 2011, the entire content of which is hereby incorporated by reference in its entirety. This application also claims priority under 35 U.S.C. § 119 of U.S. Provisional Application No. 61/544,767 filed on Oct. 7, 2011, the entire content of which is hereby incorporated by reference in its entirety.

FIELD

Disclosed is an improved process for the manufacture of fuel hydrocarbons, for example, light fuel components from renewable oil sources such as biological oils and fats. For example, disclosed is the manufacture of purified light fuel components from source material containing phosphorus and metal impurities.

BACKGROUND INFORMATION

Environmental interests and an increasing demand for diesel fuel, for example, in Europe, can encourage fuel producers to employ more intensively available renewable sources. In the manufacture of diesel fuels based on biological raw materials, an interest has concentrated on vegetable oils and animal fats comprising triglycerides of fatty acids. Long, straight and mostly saturated hydrocarbon chains of fatty acids can correspond chemically to the hydrocarbons present in diesel fuels. However, neat vegetable oils can display inferior properties, for example, extremely high viscosity and poor stability, and therefore their use as such in transportation fuels as components can be limited.

Approaches for converting vegetable oils or other fatty acid derivatives into liquid fuels comprise, for example, transesterification into fatty acid methyl ester (FAME). Unfortunately, the obtained product can offer poor low-temperature properties and can result in undesirably high emissions of $NO_x$ in comparison to diesel fuels.

One approach is to convert the fatty acids or their esters to hydrocarbons by deoxygenation reactions. The deoxygenation of oils and fats based on biological material may be carried out by catalytic hydroprocessing, such as hydrocracking, or in a more controlled manner using hydrotreating conditions. During hydrotreating, for example, hydrodeoxygenation, oxygen containing groups are reacted with hydrogen in the presence of a catalyst, and oxygen is removed through formation of water.

However, due to, for example, a high amount of phosphorus and metal impurities in vegetable or animal oil or fat ash containing material will be formed, the probability of side reactions may be increased and deactivation of the catalyst may be likely. Metals in biological oil may additionally form metal soaps which promote plugging of preheating section and decrease catalyst activity and operating life. Therefore, it can be desirable to decrease the content of impurities in the crude oil to be treated prior to further processing.

The impurity quality and quantity of biological oils and/or fats can vary considerably in feedstock from varying origin. Different impurities can be removed by different purification procedures. For example, animal fats can provide the most challenging source material which can be very difficult to purify. On the other hand, animal fat can be a highly desirable feedstock for fuel production, since animal fat is considered a waste stream which, for example, can require or benefit from proper treatment to be discharged. Animal fat has shorter fatty acids chain lengths compared to many vegetable oils which can result in excellent properties in renewable fuels produced by hydrogenation thereof.

Biological raw material can contain, in addition to metals and phosphorus, metal compounds, organic nitrogen and sulfur which can act as catalyst inhibitors and poisons, for example, reducing the catalyst service life and, for example, making more frequent catalyst regeneration or replacement desirable. Metals in biological oils and/or fats can build up on catalyst surface and change activity and selectivity of the catalyst. Moreover, metals can promote side reactions such as ash forming and blocking of catalyst. These kinds of phenomena can increase the pressure drop over catalyst beds and further decrease the activity of the catalysts. For example, metals such as Na, Ca, Mg and Fe can be detrimental and it can be desirable to remove same as efficiently as possible.

A desire for purification of biological oils and fats before subjecting them to hydrotreatment and formation of renewable fuel components is recognized in several publications. US 2006/0264684 describes several pre-treatment methods for purification of biological oils. US 2007/0010682 suggests degumming and/or bleaching of biological oils in order to reduce the phosphorous and total metal content of the biological oils prior to the hydrotreatment process.

SUMMARY

According to an exemplary aspect, a method for producing liquid fuel components from renewable oil is provided, the method comprising: subjecting a fresh feedstock of renewable oil comprising saturated fatty acids to dilution with an organic lipophilic solvent containing less than 5 ppm phosphorus impurities and less than 10 ppm metal impurities to obtain a purified feedstock, wherein the fresh feedstock is subjected to the dilution before and/or during purification of the fresh feedstock by at least one pretreatment process for removal of phosphorus and metal impurities, and subsequently feeding the purified feedstock into at least one post-treatment process for producing liquid fuel components.

BRIEF DESCRIPTION OF THE DRAWINGS

FIGS. 6A and 6B are graphs showing the influence of dilution to viscosity and density, according to exemplary embodiments.

DETAILED DESCRIPTION

Figure 1:
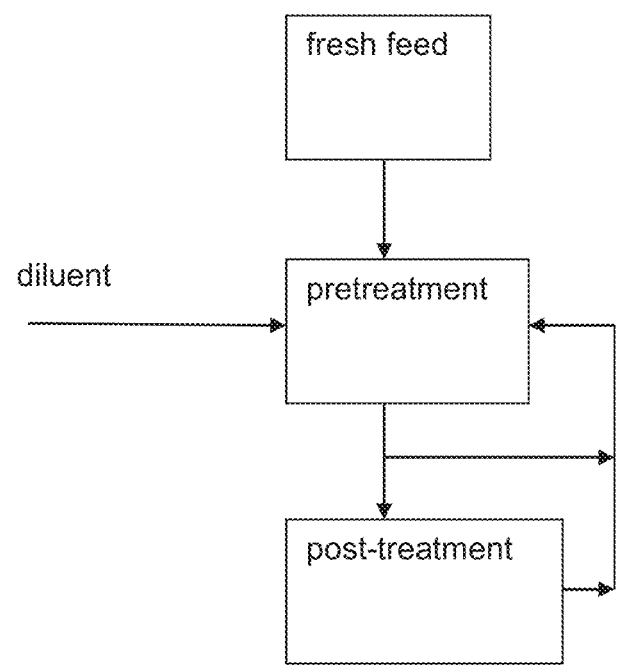
FIG. 1 shows a schematic flow diagram, according to an exemplary embodiment.

According to an exemplary aspect, provided is an improved oil purification process when treating oil obtained from a renewable oil source.

According to an exemplary aspect, the harmful impurity content of renewable oil to be further processed into liquid fuel component can be decreased.

According to an exemplary aspect, oil from renewable oil source can be purified efficiently with a high throughput.

According to an exemplary aspect, disclosed is a method for producing liquid fuel components from renewable oil.

In a process comprising first preliminary pretreatment of impure oil feedstock and subsequently post-treatment of purified oil, for example, with hydrotreatment and isomerization in order to obtain liquid fuel components, by diluting the oil to be purified the amount of impurities in the intermediate oil fraction to be subjected to further processing steps can be efficiently lowered simultaneously increasing the resulting purified oil throughput. For example, overall purification performance can be enhanced with the use of fresh oil feedstock with high amount of impurities.

Exemplary aspects can offer exemplary benefits to the processing. The lowering of the cloud point of the used oily material can result in increased purification capability and suppression of side-reactions. The decrease in solution viscosity can aid in related separation processes enhancing the throughput. The decreased plugging tendency can result in extended maintenance cycles.

The term "impurities" can include those impurities harmful or undesired in the final liquid fuel component and harmful during processing thereof comprising phosphorus, phosphorus compounds, metals or metal compounds, sulfur and compounds containing sulfur which are dissolved and/or miscible to feed oil or fat.

The term "pretreatment process" can include any suitable process or combinations of suitable processes aiming at purification of impure oil feed from the impurities. For example, these processes can comprise degumming, bleaching, centrifugation, filtering or any combination thereof which results in a decreased content of the impurities.

The term "degumming" can include a purification process wherein impure oil is treated with acid, water and caustic at elevated temperature with high shear mixing, for example, degummed. The formed gums may subsequently be separated from the oily material, for example, by centrifugation and the material may be dried.

The term "bleaching" can include a purification process wherein acid and water is added to the impure oil, and the resulting composition is mixed with an adsorbent material at elevated temperature and reduced pressure such as vacuum. Thereafter the oil is dried and separated from said adsorbent, for example, by filtration.

The term "post-treatment process" can include process steps aiming at producing paraffins and branched paraffins and rendering them suitable for liquid fuel components.

The term "hydroprocessing" can include catalytic processing of organic material by all means of molecular hydrogen.

The term "hydrotreatment" can include a catalytic process which removes oxygen from organic oxygen compounds as water, for example, hydrodeoxygenation, HDO; which removes sulfur from organic sulfur compounds as dihydrogen sulfide ($H_2S$), for example, hydrodesulfurization, HDS; which removes nitrogen from organic nitrogen compounds as ammonia ($NH_3$), for example, hydrodenitrogenation, HDN; and which removes halogens, for example, chlorine from organic chloride compounds as hydrochloric acid (HCl), for example, hydrodechlorination, HDCl; for example, under the influence of sulphided NiMo or sulphided CoMo catalysts.

The term "hydrodeoxygenation" (HDO) of triglycerides or other fatty acid derivatives or fatty acids can include the removal of carboxyl oxygen as water by the means of molecular hydrogen under the influence of catalyst.

The term "deoxygenation" can include removal of oxygen from organic molecules, such as fatty acid derivatives, alcohols, ketones, aldehydes or ethers by any means previously described.

The term "hydrocracking" can include a catalytic decomposition of organic hydrocarbon materials using molecular hydrogen at high pressures.

The term "n-paraffins" can include normal alkanes or linear alkanes that do not contain side chains.

In an exemplary method, liquid fuel components are produced from renewable oil. Exemplary features of this method are described below.

A fresh feedstock comprising saturated fatty acids, and originating from said renewable oil, is subjected to dilution by an organic lipophilic solvent containing less than 5 ppm phosphorus and less than 10 ppm metal, for example, less than 5 ppm, impurities before and/or during purification by at least one pretreatment process for removal of phosphorus and metal impurities. By removal is meant, for example, that the concentration of the impurities in the end product, i.e., liquid fuel component is lowered to an acceptable level. The metals can include at least Fe, Mg and/or Na.

Subsequently, the resulting purified feed stream can be fed into at least one post-treatment process suitable for producing liquid fuel components from the previously pretreated feedstock.

The renewable oil providing the fresh feedstock can comprise oils, fats and/or waxes originating from any living biological material. It can provide a source of triglycerides such as oils, fats and waxes of vegetable, animal or algae origin which includes saturated fatty acids. For example, said feed stock can comprise saturated fatty acids from plants such as palm, jatropha and the like, animals such as poultry, beef and wild life, fish such as pangasius, microscopic plants such as algae, microalgae, plankton and planarian, and/or oils or fats produced by microbes like yeast, bacteria and mould, or compounds derived therefrom.

The basic structural unit of an exemplary plant or animal oil or fat is a triglyceride which is a triester of glycerol, wherein the esters can contain alkyl chains of $C_5$-$C_{23}$, for example, $C_{11}$-$C_{19}$, for example, $C_{15}$-$C_{17}$ alkyl groups. These alkyl groups may contain carbon-carbon double bonds and they may be saturated, unsaturated or polyunsaturated. The fresh feedstock from the renewable oil according to an exemplary embodiment can contain at least saturated fatty acids.

The determination of an iodine value from biological oil or fat can provide a convenient measure of the degree of saturation which can be performed according to ISO 3961 standard. Iodine value is a measure of the existing double bonds. A low value can mean a highly saturated biological fat, i.e., low amount of double bonds therein. A high value can depict an unsaturated biological oil, i.e., high amount of double bonds. A good numerical estimate for the portion of the saturated fatty acids can be obtained by this type of determination.

According to an exemplary embodiment, the fresh feedstock can have an iodine value of 100 or less, for example, less than 75, for example, less than 60.

The feedstock originating from industrial processes or fresh feed satisfying the iodine value criteria of 100 or less can comprise, for example, refined or crude palm oil (for example, having an iodine value between 50-58); palm kernel oil, hydrogenated soybean oil, olive oil (for example, having an iodine value of 18-82); microbe oils (for example, having an iodine value less than 100); bacterial oils (for example, having an iodine value about 70); yeast (for example, having an iodine value of 50-55); algal oils (for example, having an iodine value less than 100); waste liquid of palm stearin (for example, having an iodine value of 28-61); palm oil fatty acid distillate (for example, having an iodine value 42-61); animal fats of high, medium and low qualities (for example, having an iodine value of 43-100); pangasius fish oil or hydrogenated fish oil (for example, having an iodine value of 59-73); FAME (fatty acid methyl ester) of animal origin (for example, having an iodine value of 55-71); jatropha oil (for example, having an iodine value of 94-116); tallow oil (for example, having an iodine value of about 40-50); and used cooking or frying oil (for example, having an iodine value of 37-111).

Processing of the oil such as purification may decrease the iodine value to some extent. For example, the amount of nonsaponified species and carotene therein can tend to increase the iodine value and, for example, chlorophyll comprises double bonds. Yet, for example, most of the double bonds can originate from the fatty acids.

In an exemplary embodiment, the fresh feedstock contains triglycerides with C5-C23 alkyl groups, for example, C11-C19 alkyl groups, for example, C15 or C17 alkyl groups. The alkyl chains can be at least partly saturated but further comprise unsaturated or polysaturated bonds. The fresh feedstock can comprise C12-C24 fatty acids or derivatives thereof, for example, anhydrides or esters of fatty acids and mixtures of fatty acids with triglycerides. Fatty acids or fatty acid esters can be produced via hydrolysis of biological oils or by their fractionalization or transesterification reactions of the triglycerides.

In an exemplary embodiment, the fresh feedstock can originate from plant based oils or fats. For example, these plants can be selected from the group of palm, soya, olive or jatropha, for example, from palm. Furthermore, the oil may originate from plants bred by means of gene manipulation.

In an exemplary embodiment, the fresh feedstock originates from animal based fats, oils and/or waxes, for example, from lard, tallow, train oil, fats contained in milk, recycled fats from the food industry and mixtures thereof which can have a low iodine value.

The impurity content of crude plant oil or animal fat can be high and dependent on the origin of the crude product. For example, phosphorus amount may be as high as about 1000 ppm for plant oil whereas the amount of metals of about 200 ppm has been observed for animal originating fats. This means that such crude oil or fat may not be suitable as such for processing, and it can be desirable to purify same before use. In order to avoid catalyst deactivation and undesired side reactions, it can be desirable for the crude oil feed to comply with the following impurity specifications: the amount of alkali and alkaline earth metals, calculated as elemental alkali and alkaline earth metals, in the feed can be below 10, for example, below 5, of example, below 3 ppm. The amount of other metals, calculated as elemental metals, in the feed can be below 10, for example, below 5 ppm, for example, below 1 ppm. The amount of phosphorus, calculated as elemental phosphorus can be below 30, for example, below 15 ppm, for example, below 5 ppm. There are several suitable purification procedures, for example, pretreatment processes, available for removal of undesired phosphorus and metals before introducing the crude oil to post-treatment processes.

In an exemplary embodiment, there can be present at least one pretreatment process for removal of phosphorus and metal impurities. For example, the pretreatment process comprises degumming. The pretreatment may further comprise other purification processes such as centrifugation, wet bleaching, dry bleaching, filtration or any combinations thereof.

An exemplary advantage of dilution in a pretreatment process such as degumming is that dilution can change the feedstock properties and the secondary effect is an enhancement of throughput or efficiency. For example, in degumming, the processing temperature for animal fat having a high cloud point can be chosen high enough resulting in degumming at a high temperature. The probability of undesired side reactions can increase considerably when the processing temperature is increased. For example, the solubility of the formed gums can be increased, as well. By diluting the fat feedstock with an organic lipophilic solvent, the processing temperature can be lowered resulting in a better overall yield.

In an exemplary embodiment, the dilution by an organic lipophilic solvent does not interfere with the remaining processing and it is not necessary, for example, to remove the diluent from the process after pretreatment. The pretreated feedstock may be introduced as is to the following post treatment sequence.

An exemplary pretreatment process comprising degumming of plant or animal oils results in removal of phosphorus compounds, such as phospholipids. Solvent extracted plant oils can contain significant amounts of gums, for example, 0.5-3% by weight, which can be mostly phosphatides i.e. phospholipids. Therefore, a degumming stage can be desired in order to remove phospholipids and metals associated thereto. For example, iron and some further metals may be present in the form of metal-phosphatide complexes. Even a trace amount of iron can be capable of catalyzing oxidation of the oil or fat. An exemplary degumming step can be performed by washing the feed at 90-105° C., 300-500 kPa, with $H_3PO_4$, NaOH and soft water and separating the formed gums. A major amount of metal components, which are harmful, for example, for hydrotreatment catalyst in the subsequent post-treatment, can be removed from the feedstock during this degumming stage. The moisture content of the degummed oil can be reduced in dryer at 90-105° C., 5-50 kPa.

In another exemplary embodiment, bleaching is used in addition to degumming in pretreatment process for fresh feed stream. In the bleaching step the feed can be heated and mixed with natural or acid-activated bleaching clay. Bleaching can remove various impurity traces left from other pretreatment steps like degumming, such as chlorophyll, carotenoids, phospholipids, metals, soaps and/or oxidation products. Bleaching can be carried out under vacuum to minimize possible oxidation. For example, in food applications, the goal in bleaching can be to reduce the color pigments in order to produce an oil of acceptable color and to reduce the oxidation tendency of oil.

In an exemplary method, the removal of phosphorus and metal impurities in the pretreatment processes, such as degumming and bleaching, can be facilitated by introduction of low phosphorus and metal content organic lipophilic solvent to the fresh feedstock stream, thus diluting the original phosphorus and metal contents thereof per unit volume entering into the pretreatment step. In order not to increase the original impurity content, the organic lipophilic solvent can contain less than 5 ppm phosphorus impurities and less than 10 ppm metal impurities.

In an exemplary method, for example, in degumming, the impurities can be converted more easily water soluble by dilution by dissociating oil soluble salts and aiding the formation of new microscopic precipitates and gums that are substantially insoluble in oil and/or water. These solid insoluble gums can become more easily separated from the aqueous phase and the oil phase by centrifugation which can be part of the degumming procedure. This separation can be enhanced by diluting the occasionally undesirably viscous oil phase.

The extent of the processing difficulties may vary depending on, for example, the densities, polarity effects and mass transfer effect of the processed oils/fats. For example, animal fats can be difficult to handle and separate. They can tend to provide metal or phosphor containing residues into the crude oil after purification in a pretreatment process step which can subsequently cause, for example, plugging in the various processing steps. The quality of some of the animal fats can be so poor that it is not possible to purify them using merely the available pretreatment processes.

In an exemplary pretreatment processes, a final step can be filtration. For example, fresh adsorbent suspended in crude oil feed in bleaching after degumming can be recycled through a filter to build up a cake on the surface of the filter mesh. This can be followed by a filtration period with a feed from the adsorber and continued until the pressure drop over the cake reaches a maximum ending the filtration and resulting in discharging the cake. The filtration can be greatly facilitated using a diluted oil feed. This can provide a synergistic effect between the particle size specification and filtration temperature. Viscosity of the crude oil feed including a diluent can be lower making the filtration easier. The addition of diluents can increase the overall flux through the filter but the cake pressure drop can decrease substantially as a result of the smaller viscosity. The overall effect or result can be that the solid impurities will plug the filter cake more slowly when dilution is provided. As a multiplicative effect the low pressure drop can give more options to material selection, such as clay selection for example, since the filtration is no longer limited by the small size of adsorbent particles. The small particles can enhance pore diffusion and improve apparent activity of the clay and aid in minimizing oil losses. Due to the lowered viscosity and lowered melting point or cloud point of the mixture the filtration can be carried out at a lower temperature wherein, for example, waxes are less soluble to oil and polyethylene particles can be removed more efficiently. Furthermore, associated decrease in temperature minimizes thermal degradation and oxidation of oils and fats. Solubility of unwanted polar phospholipids to fat or oil phase can be decreased when, for example, non-polar n-paraffin can be used as diluent. The yield of purified oil per unit time can be increased despite increasing the amount of feedstock to be purified.

Plant and animal oil, fat or wax may contain, for example, up to 30% of free fatty acids, which are formed during enzymatic hydrolysis of triglycerides, for example, when oil seeds are kept in humid atmosphere. Free fatty acids can also be formed during purification of biological oils and fats, for example, during caustic wash, for example, alkali catalyzed hydrolysis. The amount of free fatty acids present in plant oils can be lower than in animal fat. Free fatty acids can be corrosive in their nature, they can attack against the materials of the equipment or catalyst and promote various side reactions. Free fatty acids can react very efficiently with metal impurities producing metal carboxylates, which further can promote chemical side reactions. Fatty acids may also enhance the formation of heavy compounds. The boiling range of these heavy compounds can be different from the range of diesel fuel and may shorten the life of the isomerization catalyst. Due to the free fatty acids contained in bio oils and fats, the formation of heavy molecular weight compounds can be significantly increased compared to triglyceridic biological feeds, which have only low amount of free fatty acids, such as less than 1%. Naturally occurring fats and oils containing significant amounts of free fatty acids may be processed without the removal of free fatty acids.

The diluent, organic lipophilic solvent can be a straight chained, branched, cyclic or aromatic hydrocarbon with a carbon number from C3 to C20, with or without substituents. If substituted, the substituents can be selected from the group of —OH (hydroxy), —HC=O (aldehyde), —COOH (carboxylic acid), —O— (ether), —C(=O)—O— (ester), —NH$_2$ (amine), —C(=O)—N— (amide), —CN (nitrile), —S(=O)— (sulfoxide) and —S(=O)$_2$— (disulfoxide).

In an exemplary embodiment, the organic lipophilic solvent can be a product recycle stream, for example, a side stream from such part of the process wherein the amount of impurities, such as phosphorus or metals, have already been reduced to acceptable levels, for phosphorus below 5 ppm and for metals below 10 ppm, for example, below 5 ppm. For example, the organic lipophilic solvent can be recycled from the post treatment.

In another exemplary embodiment, the organic lipophilic solvent can be a mixture of straight chained, branched, cyclic or aromatic hydrocarbons. For example, the solvent can be selected from the group of product streams of the process after post-treatment. For example, it can be a hydrotreated vegetable oil product, for example, a middle distillate fraction from a process in which biological oil is hydrodeoxygenated and subsequently isomerized in an isomerization step to form a mixture of iso-paraffins, for example, with a carbon chain length of C14 to C18 (this mixture is referred to as NExBTL), Fischer-Tropsch product fraction, furfural or ethers such as dipropyl ether, dibutylether, dipentylether, MTBE (methyl tert-butylether), ETBE (ethyl tert-butylether), TAME (tert-amyl methylether) and TAEE (tert-amyl ethylether).

In another exemplary embodiment, the organic lipophilic solvent can be a mixture of recycled paraffins from the same process fulfilling the purity criteria.

In an exemplary embodiment, the organic lipophilic solvent can be a fresh solvent or a mixture of fresh solvents or a mixture of fresh and recycled solvents fulfilling the purity criteria.

The organic lipophilic solvent can be a pure fresh solvent which, for example, does not itself need to be purified.

The volume ratio of the organic lipophilic solvent to the fresh feedstock can be 0.05-5:1, for example, 0.1-2:1, for example, 0.2-1:1. Extensive dilution will lead to an unpractical process including high volumes and increased equipment size.

According to an exemplary embodiment, there can be present at least one post treatment process suitable for producing liquid fuel components. The post-treatment may comprise any suitable processing steps suitable for preparation of the liquid fuel components. For example, the post treatment step can comprise a hydrotreating process, such as deoxygenation, denitrogenation and desulfurization, and/or isomerization.

The organic lipophilic solvent may be introduced into the fresh feed stream before or during the purification, for example, the pretreatment step.

In an exemplary embodiment, the degumming step of the pretreatment can be performed to the fresh feedstock prior to dilution by the organic lipophilic solvent. Subsequently the degummed and diluted fresh feed can be, for example, centrifuged to remove the formed gums before entering into the post treatment step.

Figure 2:
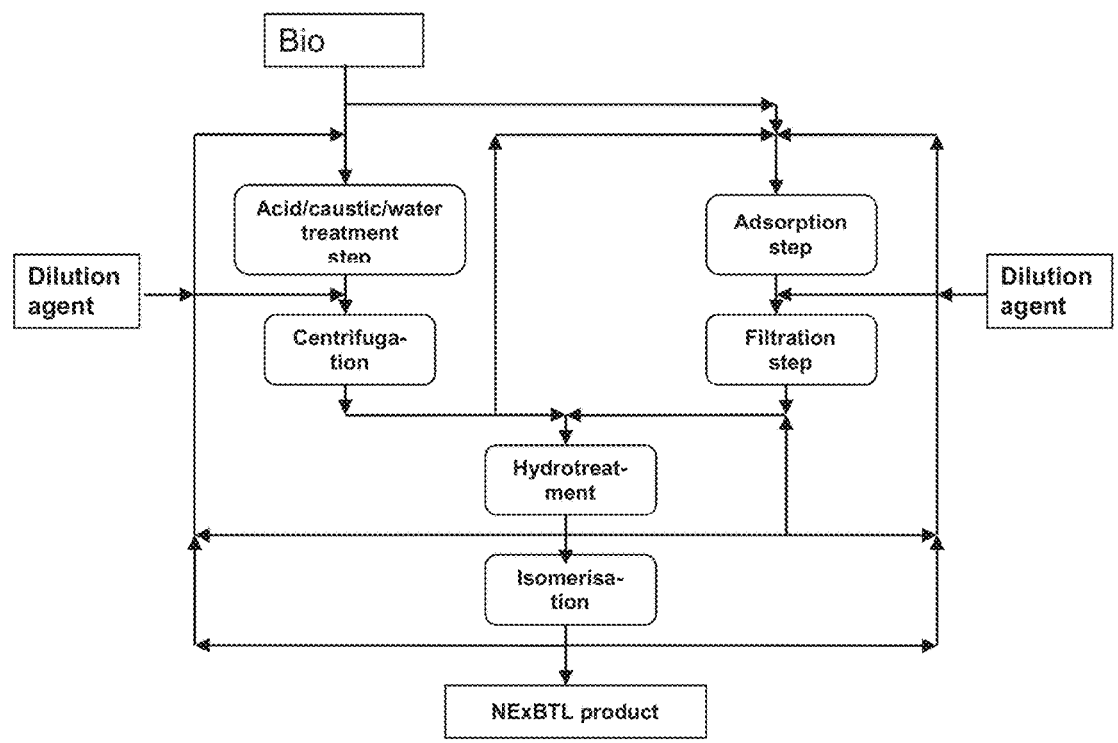
FIG. 2 shows a schematic flow diagram, according to an exemplary embodiment.
Figure 3:
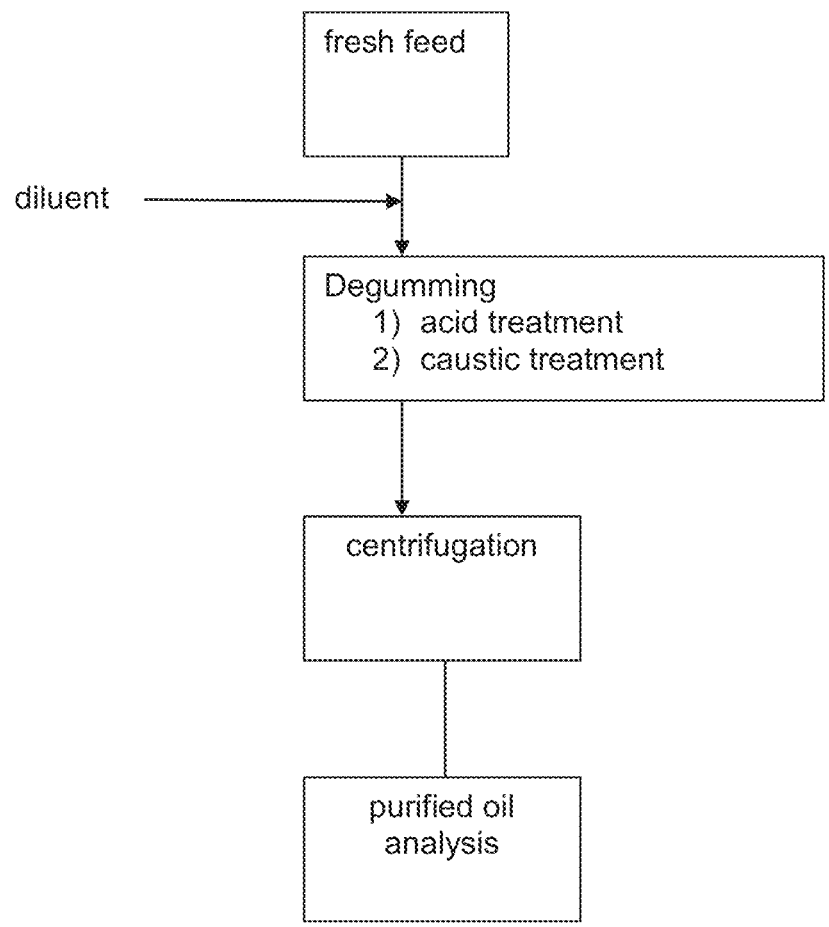
FIG. 3 shows a flow diagram of a degumming treatment in connection with example 1, according to an exemplary embodiment.

An exemplary embodiment is illustrated in FIG. 2 wherein a pretreatment process including organic lipophilic solvent dilution is linked to post-treatment processing. In this example, both pretreatment processes, parallel degumming and bleaching processes, can utilize dilution before entering the pretreated purified oil feed into the post-treatment processing. An exemplary post-treatment processing comprises a hydrotreatment step prior to isomerization step. The crude biological oil or fat can be fed into degumming step comprising first washing the feed at a temperature of 30-115° C. and a pressure of 100-1000 kPa using an acid, for example, $H_3PO_4$, and a caustic, for example, NaOH, and soft water for the aqueous phase. Diluting agent can be fed into the degumming step liquid in a volume ratio of 0.05-5:1 and subsequently the formed gums can be separated by centrifugation. The formation and separation of gums can be facilitated compared to centrifugation without any additional diluent due to decrease in forming temperature. Part of the crude biological oil or fat can be fed parallel into bleaching step comprising adsorption using clay material and subsequent filtration. The diluent feed addition before filtration can aid the filtering by slowing down the development of the filter pressure drop build up and by enhancing the throughput. The purified oil can be fed to the post-processing together with the diluent.

In an exemplary embodiment, the degumming step and bleaching steps can be in series.

In an exemplary embodiment, the diluent can be withdrawn from the pretreatment step after purification but before entering the resulting feed into the post-treatment.

In an exemplary embodiment, the used organic lipophilic solvent can be withdrawn from the post-treatment step during or after hydrotreatment or after isomerization. For example, the formed vapor phase developed during hydrotreatment can be removed from the feed before recycling it as diluents to the pretreatment step or entering the feed into the subsequent isomerization step.

The resulting liquid fuel component can be an isomerized product, which is a mixture of branched hydrocarbons, and for example, branched paraffins, boiling in the range of 180-350° C., the diesel fuel range, and having one carbon atom less than the original fatty acid chain. Additionally some gasoline and gas may be obtained.

Exemplary aspects are further illustrated by the following non-restricting examples.

EXAMPLES

Example 1

Cloud points of ten samples were determined using ISL MPP 5GS MINI analyzer.

Reference sample 1: pure (100%) animal fat (AF) with no added organic lipophilic solvent Sample 2: animal fat 90% by weight with 10% by weight of added organic lipophilic solvent wherein the solvent was NExBTL Sample 3: animal fat 80% by weight with 20% by weight of added organic lipophilic solvent wherein the solvent was NExBTL Sample 4: animal fat 60% by weight with 40% by weight of added organic lipophilic solvent wherein the solvent was NExBTL Sample 5: animal fat 20% by weight with 80% by weight of added organic lipophilic solvent wherein the solvent was NExBTL Reference sample 6: pure NExBTL Sample 7: animal fat 90% by weight with 10% by weight of added organic lipophilic solvent wherein the solvent was heptane Sample 8: animal fat 80% by weight with 20% by weight of added organic lipophilic solvent wherein the solvent was heptane Sample 9: animal fat 60% by weight with 40% by weight of added organic lipophilic solvent wherein the solvent was heptane Sample 10: animal fat 20% by weight with 80% by weight of added organic lipophilic solvent wherein the solvent was heptane Animal fat and the organic lipophilic solvent were heated to 45° C., weighted to 100 ml flasks and mixed vigorously to obtain a homogeneous mixture.

The cloud point analysis was measured based on optical detection. A 0.5 ml sample is pipetted to a disposable cuvette, which is installed into the analyzer. The analyzer melts the sample at first by preheating the cuvette. Subsequently, the sample is cooled slowly until first crystals appear at cloud point temperature.

Figure 4:
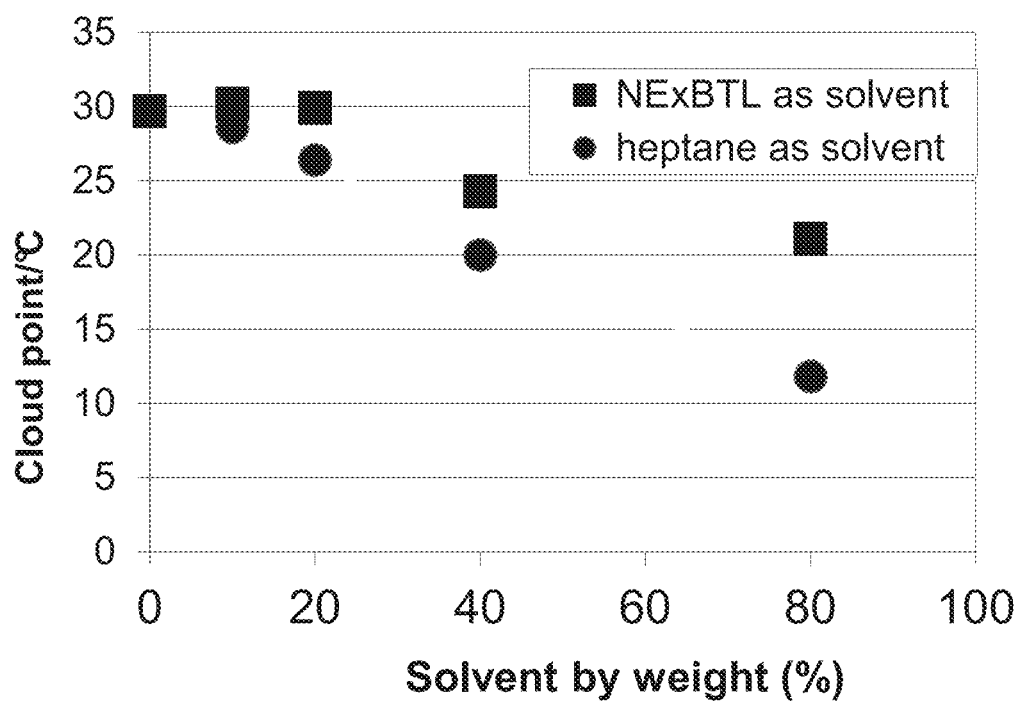
FIG. 4 shows a graph of cloud point depression due to dilution in connection with example 2, according to an exemplary embodiment.

The results in Table 1 and FIG. 4 show that the cloud point decreases considerably when the amount of solvent is increased.

TABLE 1

| % solvent by | AF same (° C.) | |
| --- | --- | --- |
| weight | NExBTL | heptane |
| 0 | 29.7 | |
| 10 | 30.2 | 28.6 |
| 20 | 29.9 | 26.4 |
| 40 | 24.3 | 20.0 |
| 80 | 21.1 | 11.8 |
| 100 | −48.5 | |

Example 2

Animal fat (=AF) originating from food industry waste having an iodine value of about 55 was used as feedstock. Three test runs were made by varying the dilution of the fresh feedstock (samples 2-3) before entering it into degumming.

Reference sample 1: pure (100%) animal fat with no added organic lipophilic solvent Sample 2: animal fat 80% by weight with 20% by weight of added organic lipophilic solvent wherein the solvent was NExBTL Sample 3: animal fat 60% by weight with 40% by weight of added organic lipophilic solvent wherein the solvent was NExBTL Reference sample 4: pure NExBTL NExBTL diesel retrieved from the process outlet was stabilized in Rotavapor at 100 mbar pressure and 105° C. temperature. Stabilization was made to remove the light hydrocarbons for safety reasons. Cloud point of the NExBTL diesel was measured to be −48.5° C.

A feedstock sample was taken for metal content analysis and phosphorus analysis (ASTMD5185). Animal fat feedstock samples 2 and 3 were diluted by NExBTL in a flask at 45° C.

Subsequently, degumming was performed. Test run mixture was thermostatically adjusted to 45° C., and 1000 mg/kg of citric acid was added as a 50% by weight water solution. Silverson high-shear mixer was turned on (8000 rpm) for 2 minutes to create an emulsion. Slow mixing with magnetic stirrer (250 rpm) was continued for 15 minutes after the vigorous mixing. The resulting mixture was cooled to the degumming temperature, 45° C., 35° C. and 30° C., and 2% by weight water and 250 mg/kg lye was added. High-shear mixing was turned on for 2 minutes where after slow mixing was continued for 60 minutes. Finally, the formed gums and water phases were separated from the oil phase by centrifugation (4300 rpm) for 5 minutes at the degumming temperature.

A sample for metal, P and nitrogen analyses was taken from the oil product.

TABLE 2

|  |  | Feed | Product | removal(%) |
|---|---|---|---|---|
| 100% AF, 45° C. | | | | |
| Water | mg/kg | 870 | 4400 | — |
| Fe | mg/kg | 2.8 | 0.2 | 93 |
| Na | mg/kg | 11.4 | 3.8 | 67 |
| Ca | mg/kg | 117 | 1 | 99 |
| Mg | mg/kg | 2.8 | 0.2 | 93 |
| P | mg/kg | 75.3 | 8.4 | 89 |
| 20% NExBTL + 80% AF, 35° C. | | | | |
| Water | mg/kg | 660 | 3000 | — |
| Fe | mg/kg | 2.6 | 0.09 | 97 |
| Na | mg/kg | 10.5 | 1.9 | 82 |
| Ca | mg/kg | 99.1 | 1.2 | 99 |
| Mg | mg/kg | 2.7 | 0.07 | 97 |
| P | mg/kg | 70.4 | 4.5 | 94 |
| 40% NExBTL + 60% AF, 30° C. | | | | |
| Water | mg/kg | 470 | 1800 | — |
| Fe | mg/kg | 1.9 | 0.09 | 95 |
| Na | mg/kg | 8.3 | 1.5 | 82 |
| Ca | mg/kg | 75.3 | 0.7 | 99 |
| Mg | mg/kg | 2.0 | 0.05 | 98 |
| P | mg/kg | 49.4 | 3.5 | 93 |

From Table 2, it can be seen that the removal percentage for phosphorus is increased from 89% (undiluted) to 94% and 93% with 20% and 40% dilutions, respectively. The removal percentage (removal (%)) is calculated as the amount of impurities removed from the feed. The removal percentage is also increased for Fe.

Example 3

Figure 5:
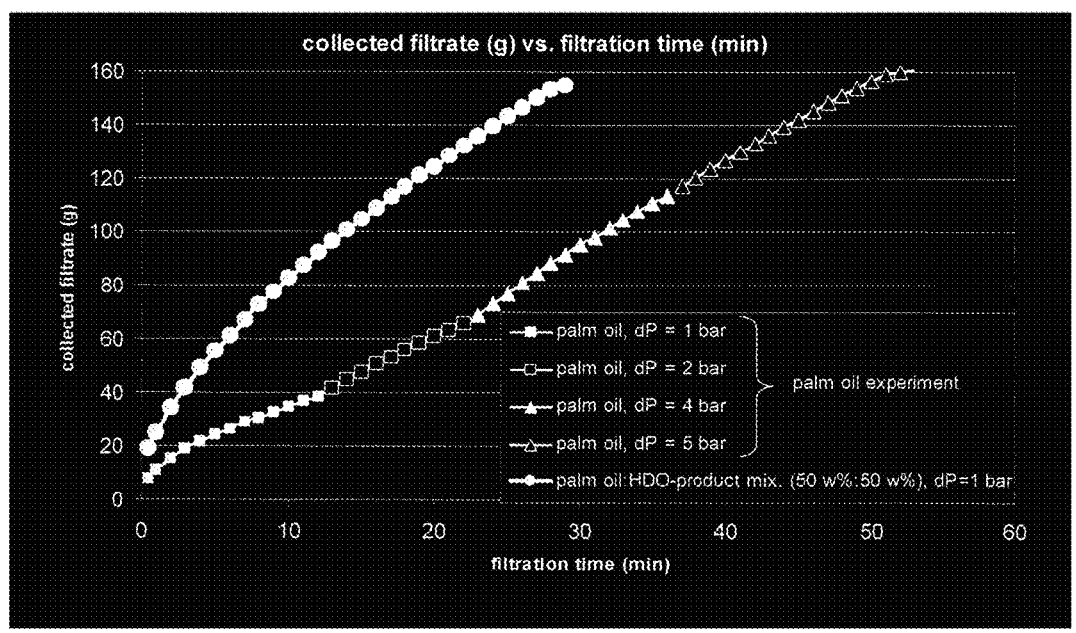
FIG. 5 is a graph depicting the effect of dilution to pressure drop in filtering in connection with example 3, according to an exemplary embodiment.

Undiluted palm oil (CPO) and a mixture of 50 w-% hydrodeoxygenated (HDO) vegetable oil (HDO) and 50 w-% palm oil was filtered through a 4 g cake of BASF/F-160 clay in Dahlmann apparatus (filter surface ~0.001 m$^2$). The hydrodeoxygenated diluent contained mainly n-paraffinic $C_{16}$ and $C_{18}$ hydrocarbons. The pressure drop (=dp) was measured over the cake for the two filtration series and the collected filtrate (g) versus the filtration time is depicted in FIG. 5.

From the figure it can be seen that for the 50/50 mixture already at 10 min. filtration time, more than twice the amount of filtrate is collected (less than 40 g for palm oil compared to more than 80 g for 50/50 mixture). At 20 min., the pressure drop for palm oil has already increased to 2 bar compared to 1 bar at the beginning and the collected filtrate for palm oil is still only half the amount of the 50/50 mixture.

Based on the experiment, theoretical densities and viscosities for the pure components and mixtures were calculated. Using C18 n-paraffin as hydrodeoxygenated diluent and 891 g/mol as the molar mass of palm oil and 254.5 g/mol as the molar mass of n-paraffin, densities and viscosities of the pure components and mixtures were obtained as presented in FIGS. 6A and 6B, respectively.

The theoretical pressure drop ($\Delta p$) for palm oil and the diluted mixture were calculated from Ergun equation based on the calculated densities and viscosities and the measured data. From Table 3 it can be seen that the agreement between the measured data and calculated pressure drop is good when the cake porosity is adjusted to 0.268. The calculated pressure drop for various mixtures is presented in Tables 4 and 5 at 60° C. and 90° C., respectively. From Tables 4 and 5 it can be seen that significant decrease in pressure drop can be achieved already with 10 to 30% by weight dilution of palm oil.

Table 3 shows the comparison of the measured pressure drop and the calculated pressure drop for pure palm oil and 50/50 mixture with hydrodeoxygenated diluent.

Table 4 shows the effect of diluent addition on pressure drop in filtration at 60° C., and Table 5 shows the effect of diluent addition on pressure drop in filtration at 90° C.

TABLE 3

| feed | filtration temperature (° C.) | mean adsorbent particle diameter (μm) | liquid density (kg/m3) | liquid viscosity (Pa*s) | cake height (m) | cake porosity& | flux (kg/m2/h) | measured pressure drop (bar) | calculated pressure drop, Ergun (bar) |
|---|---|---|---|---|---|---|---|---|---|
| RBD palm oil | 90 | 7.6 | 862 | 0.0086 | 6 | 0.268 | 74 | 1.0 | 0.9 |
| RBD palm oil | 90 | 7.6 | 862 | 0.0086 | 6 | 0.268 | 253 | 3.0 | 3.0 |
| RBD palm oil | 90 | 7.6 | 862 | 0.0086 | 6 | 0.268 | 470 | 5.0 | 5.6 |
| RBD palm oil | 55 | 7.6 | 887 | 0.0229 | 6 | 0.268 | 168 | 6.0 | 5.2 |
| RBD palm oil:HDO-product (50:50 w %) | 55 | 7.6 | 815 | 0.0037 | 6 | 0.268 | 232 | 1.0 | 1.3 |

TABLE 4

| filtration temperature (° C.) | mean adsorbent particle diameter (μm) | liquid density (kg/m3) | liquid viscosity (Pa*s) | cake height (mm) | cake porosity | flux & (kg/m2/h) | calculated pressure drop, Ergun (bar) | % decrease of pressure drop compared to no diluent case |
|---|---|---|---|---|---|---|---|---|
| 60 | 7.6 | 883 | 0.0198 | 15 | 0.268 | 230 | 15.53 | 0.0 |
| 60 | 7.6 | 868 | 0.0105 | 15 | 0.268 | 256 | 9.29 | −40.2 |
| 60 | 7.6 | 853 | 0.0069 | 15 | 0.268 | 288 | 6.96 | −55.2 |
| 60 | 7.6 | 839 | 0.0051 | 15 | 0.268 | 329 | 5.97 | −61.5 |
| 60 | 7.6 | 825 | 0.0040 | 15 | 0.268 | 383 | 5.65 | −63.6 |
| 60 | 7.6 | 811 | 0.0034 | 15 | 0.268 | 460 | 5.77 | −62.8 |

TABLE 5

| diluent w % of the oil feed | filtration temperature (° C.) | mean adsorbent particle diameter (μm) | liquid density (kg/m3) | liquid viscosity (Pa*s) | cake height (mm) | cake porosity | flux & (kg/m2/h) | calculated pressure drop, Ergun (bar) | % decrease of pressure drop compared to no diluent case |
|---|---|---|---|---|---|---|---|---|---|
| 0 | 90 | 7.6 | 862 | 0.0086 | 15 | 0.268 | 230 | 6.90 | 0.0 |
| 10 | 90 | 7.6 | 847 | 0.0050 | 15 | 0.268 | 256 | 4.57 | −33.8 |
| 20 | 90 | 7.6 | 832 | 0.0035 | 15 | 0.268 | 288 | 3.66 | −46.9 |
| 30 | 90 | 7.6 | 818 | 0.0027 | 15 | 0.268 | 329 | 3.30 | −52.2 |
| 40 | 90 | 7.6 | 804 | 0.0023 | 15 | 0.268 | 383 | 3.24 | −53.1 |
| 50 | 90 | 7.6 | 791 | 0.0019 | 15 | 0.268 | 460 | 3.40 | −50.7 |

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for producing liquid fuel components from renewable oil, the method comprising:
    subjecting a fresh feedstock of renewable oil comprising saturated fatty acids to dilution with an organic lipophilic solvent containing less than 5 ppm phosphorus impurities and less than 10 ppm metal impurities, wherein the organic lipophilic solvent consists essentially of a mixture of iso-paraffins with a carbon chain length of C14 to C18, wherein the fresh feedstock is subjected to the dilution before and/or during purification of the fresh feedstock by at least one pretreatment process for removal of phosphorus and metal impurities and for forming a purified feedstock, wherein the pretreatment process comprises a degumming process, wherein the fresh feedstock is subjected to the dilution before and/or during the degumming process, and
    subsequently feeding the purified feedstock into at least one post-treatment process for producing liquid fuel components,
    wherein a volume ratio of the organic lipophilic solvent to the fresh feedstock is within a range of from 0.1:1 to 2:1, and
    wherein the purified feedstock contains less than 5 ppm phosphorus impurities and less than 10 ppm metal impurities, wherein the metal impurities comprise Fe, Na, Ca, and Mg.

2. The method according to claim 1, wherein the purified feedstock is centrifuged to remove a gum formed from the degumming process.

3. The method according to claim 1, wherein the post-treatment process comprises a hydrotreating step and an isomerization step.

4. The method according to claim 3, wherein the post-treatment process comprises conducting the hydrotreating step including hydrogenation and deoxygenation, and subsequently conducting the isomerization step.

5. The method according to claim 1, wherein the renewable oil includes an animal oil or fat, a plant oil or fat, a microscopic plant oil or fat, a microbe oil or fat, or a combination thereof.

6. The method according to claim 1, wherein the fresh feedstock of renewable oil comprising saturated fatty acids has an iodine value of less than 100.

7. The method according to claim 1, wherein the post-treatment process comprises a hydrotreating step and an isomerization step, wherein a vapor phase formed during the hydrotreating step is removed before conducting the isomerization step.

8. The method according to claim 1, wherein the fresh feedstock of renewable oil comprising saturated fatty acids has an iodine value of less than 75.

9. The method according to claim 1, wherein the fresh feedstock of renewable oil comprising saturated fatty acids has an iodine value of less than 60.

10. The method according to claim 1, wherein the volume ratio of the organic lipophilic solvent to the fresh feedstock is within a range of from 0.2:1 to 1:1.

11. The method according to claim 1, wherein the organic lipophilic solvent contains less than 5 ppm metal impurities.

12. The method according to claim 1, wherein the pretreatment process further comprises a bleaching process, a centrifugation process, a filtering process, or a combination thereof.

13. The method according to claim 1, wherein the dilution is conducted prior to the pretreatment process.

14. The method according to claim 1, wherein the pretreatment process consists of the degumming process and optionally a centrifugation process.

15. The method according to claim 13, wherein the pretreatment process consists of the degumming process and optionally a centrifugation process.

16. The method according to claim 15, wherein the post-treatment process comprises a hydrotreating step and an isomerization step.

17. The method according to claim 1, wherein a weight ratio of the organic lipophilic solvent to the fresh feedstock is 1:9 to 1:1.5.

18. The method according to claim 1, wherein a weight ratio of the organic lipophilic solvent to the fresh feedstock is 1:9 to 1:4.

19. A method for producing liquid fuel components from renewable oil, the method comprising:
   subjecting a fresh feedstock of renewable oil comprising saturated fatty acids to dilution with an organic lipophilic solvent containing less than 5 ppm phosphorus impurities and less than 10 ppm metal impurities, wherein the organic lipophilic solvent consists essentially of a mixture of iso-paraffins with a carbon chain length of C14 to C18, wherein the fresh feedstock is subjected to the dilution before purification of the fresh feedstock by at least one pretreatment process for removal of phosphorus and metal impurities and for forming a purified feedstock, wherein the pretreatment process comprises a degumming process, wherein the fresh feedstock is subjected to the dilution before the degumming process, and
   subsequently feeding the purified feedstock into at least one post-treatment process for producing liquid fuel components,
   wherein a volume ratio of the organic lipophilic solvent to the fresh feedstock is within a range of from 0.1:1 to 2:1.

20. A method for producing liquid fuel components from renewable oil, the method comprising:
   subjecting a fresh feedstock of renewable oil comprising saturated fatty acids to dilution with an organic lipophilic solvent containing less than 5 ppm phosphorus impurities and less than 10 ppm metal impurities, wherein the organic lipophilic solvent consists essentially of a mixture of iso-paraffins with a carbon chain length of C14 to C18, wherein the fresh feedstock is subjected to the dilution during purification of the fresh feedstock by at least one pretreatment process for removal of phosphorus and metal impurities and for forming a purified feedstock, wherein the pretreatment process comprises a degumming process, wherein the fresh feedstock is subjected to the dilution during the degumming process, and
   subsequently feeding the purified feedstock into at least one post-treatment process for producing liquid fuel components,
   wherein a volume ratio of the organic lipophilic solvent to the fresh feedstock is within a range of from 0.1:1 to 2:1, and
   wherein the purified feedstock contains less than 5 ppm phosphorus impurities and less than 10 ppm metal impurities, wherein the metal impurities comprise Fe, Na, Ca, and Mg.

21. A method for producing liquid fuel components from renewable oil, the method comprising:
   subjecting a fresh feedstock of renewable oil comprising saturated fatty acids to dilution with an organic lipophilic solvent wherein the organic lipophilic solvent consists essentially of a mixture of iso-paraffins with a carbon chain length of C14 to C18, containing less than 5 ppm phosphorus impurities and less than 10 ppm metal impurities, wherein the fresh feedstock is subjected to the dilution before and during purification of the fresh feedstock by at least one pretreatment process for removal of phosphorus and metal impurities and for forming a purified feedstock, wherein the pretreatment process comprises a degumming process, wherein the fresh feedstock is subjected to the dilution before and during the degumming process, and
   subsequently feeding the purified feedstock into at least one post-treatment process for producing liquid fuel components,
   wherein a volume ratio of the organic lipophilic solvent to the fresh feedstock is within a range of from 0.1:1 to 2:1, and
   wherein the purified feedstock contains less than 5 ppm phosphorus impurities and less than 10 ppm metal impurities, wherein the metal impurities comprise Fe, Na, Ca, and Mg.

22. The method according to claim 1, wherein the organic lipophilic solvent consists of a mixture of iso-paraffins with a carbon chain length of C14 to C18.

* * * * *